G. C. HOPKINS.
SMOKER'S PIPE.
APPLICATION FILED APR. 8, 1914.
1,136,422.
Patented Apr. 20, 1915.
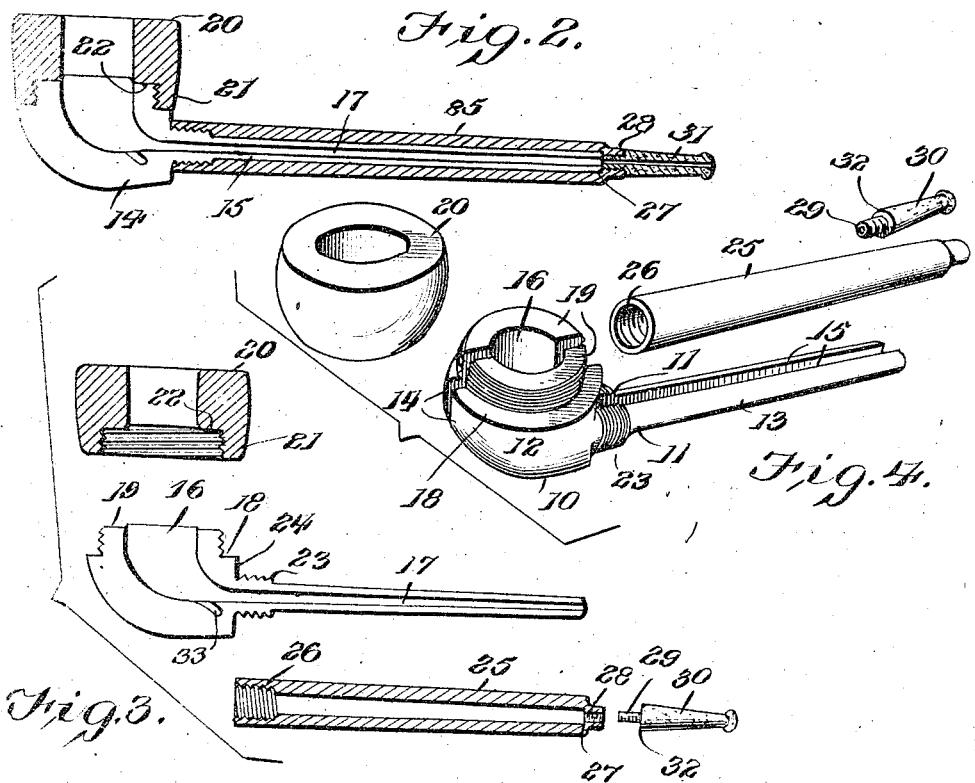
Inventor
G. C. Hopkins.

UNITED STATES PATENT OFFICE.

GEORGE C. HOPKINS, OF WINNSBORO, TEXAS.

SMOKER'S PIPE.

1,136,422.

Specification of Letters Patent.

Patented Apr. 20, 1915.

Application filed April 8, 1914. Serial No. 830,446.

*To all whom it may concern:*

Be it known that I, GEORGE C. HOPKINS, a citizen of the United States, residing at Winnsboro, in the county of Wood and State of Texas, have invented certain new and useful Improvements in Smokers' Pipes, of which the following is a specification.

This invention relates to tobacco pipes, and has for its object to provide an article of this character so constructed that it may be easily maintained in a sanitary condition.

The invention has as a further object to provide a pipe, the several parts of which may be disassembled to permit access to the interior of the bowl of the pipe, as well as to the duct thereof leading through the stem so that the pipe may be readily cleaned.

A further object of the invention is to provide a pipe so constructed that the several parts thereof when assembled, will not only provide a rigid structure but wherein the draft through the pipe will not be impaired through leakage of air between the adjacent sections of the pipe into the duct formed in the stem thereof. And a still further object of the invention is to provide a pipe composed of few and simple parts which may be readily assembled or disassembled.

With these and other objects in view, my invention will be more fully described, illustrated in the accompanying drawings and then specifically pointed out in the claim which is attached to and forms a part of this application.

In the drawings, Figure 1 is a perspective view of my improved pipe showing the parts thereof assembled. Fig. 2 is a longitudinal sectional view, one section forming the body portion of the pipe being shown in full lines. Fig. 3 is a view similar to Fig. 2 showing the parts detached but in proper relative position, and Fig. 4 is a detail perspective view showing the parts of the pipe detached but in proper relative position.

Corresponding and like parts are referred to in the following description and indicated in all the views of the drawings by the same reference characters.

Referring more particularly to the drawings the body portion 10 of my improved pipe includes the mating sections 11, the base of the bowl of the pipe being indicated at 12. The base 12 is preferably rounded and has integrally formed thereon a stem 13 the stem being split longitudinally with the base, each section 14 of the base carrying a corresponding portion 15 of the stem. The base 12 is centrally recessed as at 16 and communicating with such recess is a duct 17 formed in the stem.

The base 12 is provided adjacent its upper extremity with an annular shoulder 18 and is formed with a reduced extension 19 which is screw threaded upon its outer face to receive the bowl 20. The bowl 20 is provided at one extremity thereof with a longitudinally extending peripheral flange 21 defining at the inner extremity thereof an internal annular shoulder 22, the flange 21 being internally screw threaded to engage the reduced extension 19. As is best shown in Fig. 2 of the drawings, the bowl 20 when positioned upon the base 12 forms by its inner walls a continuation of the inner walls of the head, the shoulder 22 seating against the upper extremity of the reduced extension 19 and the flange 21 contacting at its free extremity with the shoulder 18. It will be noted that the bowl 20 when in position serves to effectually clamp the sections of the head together.

The inner extremity of the stem 13 is screw threaded as at 23, the base 12 being formed with a shoulder 24 at the inner extremity of said threaded portion. A barrel 25 is disposed to receive the stem 13, said barrel being internally screw threaded adjacent one extremity as at 26 to engage the threaded extremity of the stem 13, the adjacent end of the barrel engaging against the shoulder 24 formed on the base.

The barrel 25 is reduced adjacent its outer extremity forming an internal shoulder 27 disposed to contact with the adjacent end of the stem 13 in the assembled position of the barrel upon the stem. It will thus be noted that the barrel serves to firmly hold the sections of the stem tightly together not only providing a rigid structure but also making it impossible for air to gain entrance to the duct of the stem between the adjacent confronting faces of the sections of the stem.

The outer extremity of the barrel 25 is internally screw threaded as at 28 and is disposed to receive the externally threaded reduced extension 29 of the mouth-piece 30, said mouth-piece being formed with a duct 31 communicating with the duct of the stem. It will be noted that when the mouth-piece is operatively connected to the barrel, the shoulder 32 formed at the inner extremity of the reduced extension is disposed to contact with the adjacent end of the barrel, the free extremity of said reduced portion bearing against the adjacent extremity of the stem 13. A tight joint is thus provided to maintain a perfect draft through the pipe.

From the above description it will be seen that the parts of my improved pipe may be readily disassembled by removing the bowl 20, the mouth-piece 30 and the barrel 25, the sections 11 forming the body portion of the pipe being so constructed as to permit access to the interior of the bowl of the pipe as well as to permit ready access to the duct formed in the stem. Thus the pipe may be readily cleaned and accordingly kept in a sanitary condition. If desired, a recess 33 may be formed in the base of the bowl, the walls of such recess being preferably inclined downwardly and toward the stem, the recess being designed to collect moisture flowing through the stem into the bowl of the pipe as well as to prevent nicotin from flowing from the bowl into the stem to thence gain access to the mouth of the user.

Having thus described my invention what is claimed as new is:

A pipe including a body portion having a recess formed therein, the said body portion being formed of mating sections each having one section of a stem integrally formed thereon, the said sections of the stem being externally screw threaded adjacent the body portion and having grooves formed therein disposed to coincide to provide a duct within the stem communicating with said recess, a bowl detachably uniting the sections of the body portion, an annular shoulder formed on the body portion at the inner extremities of the stem sections, a barrel surrounding the sections of the stem and being internally screw threaded adjacent one extremity to engage the threads of the stem sections with the adjacent end of the barrel seating against the said annular shoulder, the opposite extremity of the barrel being reduced to provide an internal annular shoulder disposed to abut the outer extremities of the stem sections, the said reduced extremity of the barrel being internally screw threaded, and a mouthpiece screw threaded at one extremity and engaging the screw threads of the reduced extremity of the barrel, with the adjacent end of the mouthpiece abutting the outer ends of the stem sections.

In testimony whereof I affix my signature in presence of two witnesses.

GEORGE C. HOPKINS. [L. S.]

Witnesses:
G. A. PEACOCK,
WILL C. ANDERSON.